Figure 1:
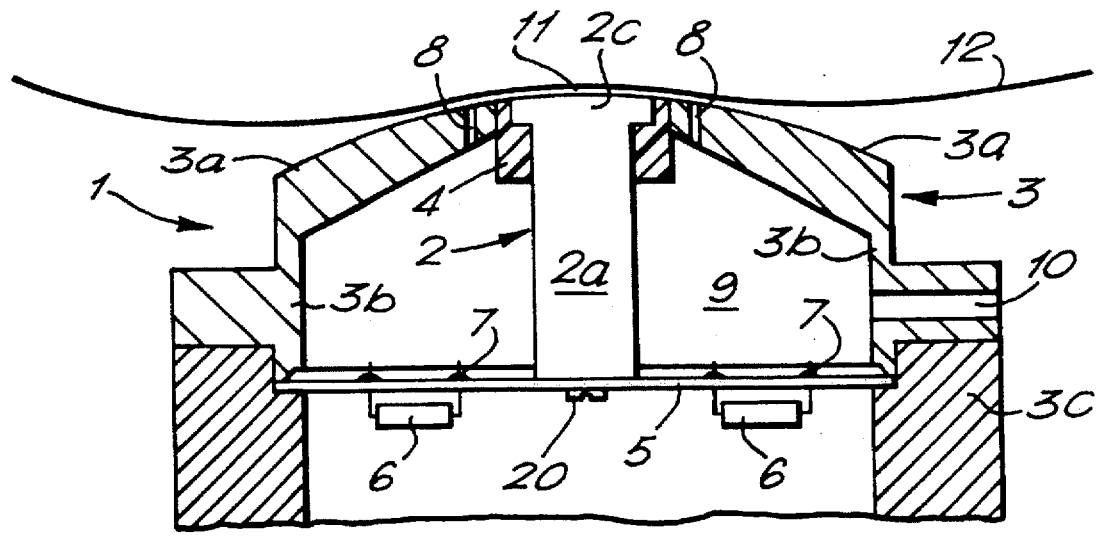

United States Patent [19]
Haynes

[11] Patent Number: 5,742,167
[45] Date of Patent: Apr. 21, 1998

[54] FILM THICKNESS MEASURING CAPACITIVE SENSORS

[75] Inventor: Anthony Charles Rendell Haynes, Lewes, England

[73] Assignee: Sussex Instruments Plc., Lewes, England

[21] Appl. No.: 707,024

[22] Filed: Sep. 10, 1996

Related U.S. Application Data

[63] Continuation of Ser. No. 142,388, filed as PCT/GB92/00934 May 22, 1992, abandoned.

[30] Foreign Application Priority Data

May 23, 1991 [GB] United Kingdom ............ 9111140

[51] Int. Cl.⁶ ................ G01N 27/22; G01R 27/26
[52] U.S. Cl. ............ 324/671; 324/663; 324/687; 324/690
[58] Field of Search ................ 324/229, 662, 324/663, 671, 686, 687, 688, 690; 340/870.37

[56] References Cited

U.S. PATENT DOCUMENTS

| | | | |
|---|---|---|---|
| 1,946,924 | 2/1934 | Allen et al. | 324/111 |
| 3,586,972 | 6/1971 | Tulleners | 324/688 |
| 3,857,095 | 12/1974 | Mitchie et al. | 324/662 |
| 4,450,404 | 5/1984 | Williams et al. | 324/229 |
| 4,454,469 | 6/1984 | Achtermann et al. | 324/662 |
| 4,498,045 | 2/1985 | Dworsky | 324/71.5 |
| 4,563,635 | 1/1986 | Wagner et al. | 324/688 |
| 4,647,855 | 3/1987 | Berglund | 324/229 |
| 4,742,299 | 5/1988 | Stone | 324/230 |
| 5,077,522 | 12/1991 | Lahitte et al. | 324/687 X |
| 5,270,664 | 12/1993 | McMurtry et al. | 324/690 |

FOREIGN PATENT DOCUMENTS 0113303  7/1982  Japan ............ 324/671

*Primary Examiner*—Glenn W. Brown
*Attorney, Agent, or Firm*—Alix, Yale & Ristas, LLP

[57] ABSTRACT

A capacitive technique for measuring the thickness of non-conductive, flexible sheet material consists of placing the sheet material over the gap between a pair of coaxial electrodes, the electrodes defining a sensor surface, and keeping the sheet material spaced from the sensor surface by establishing a layer of gas therebetween.

21 Claims, 1 Drawing Sheet

FILM THICKNESS MEASURING CAPACITIVE SENSORS

This is a continuation of application Ser. No. 08/142,388 filed as PCT/GB92/00934 May 22, 1992, now abandoned.

The present invention relates to capacitive sensors for measuring the thickness of films.

The principles of the capacitive measurement of film thickness are well known. The film slides over an arrangement of measuring electrodes which contact with one side of the film surface. The capacitive fringe field of the electrodes curves through the film and back again, and the capacitance of the electrode arrangement is increased in proportion to the value of the dielectric constant of the film and its thickness. This change in capacitance is sensed by appropriate electronic circuitry well known in the art, and converted into an appropriate signal indicative of the film thickness. Such sensors do not measure thickness absolutely, since in practice the value of the film's dielectric constant is not known and may vary with temperature. Therefore, the sensor is calibrated by adjusting the gain of an electronic amplifier connected to the sensor, until the capacitive measurement matches that of an absolute gauge such as a micrometer. Once calibrated, the sensor is able to measure the film thickness to a high degree of accuracy and so is able to provide, for example, feedback for controlling a film production process.

For the sensors to provide measurements of repeatable accuracy, the electrodes and the film must remain in fixed relation to one another, because their relative movement would affect the capacitance readings. Also, the sensor and film must be kept quite close to one another due to the rapid decrease in the strength of the capacitive field with distance from the electrodes. This means that, in practice, either the electrodes of the prior art sensors must directly contact the film, or the sensors must have guides touching the film which keep the electrodes and film a fixed and short distance apart. It would be impracticable to accurately hold the prior art sensors a fixed distance from the film without using touching guides, and in many cases, such as when the film thickness of a pressurised bubble is being measured, the point on the film surface at which the sensor is to make its readings must be deformed slightly out of its normal shape so that the film may remain at a constant separation across the electrode surfaces. If one were to merely hold the sensor out of contact with the film bubble, then the convex shape of the film surface and variations in its position would produce a non-constant gap width.

Thus, although such contacting sensors may be satisfactory for many materials used for film production, such as low and high density polyethylene and some polypropylene and PVC types, the sensors are unsuitable for measuring a number of films such as, for example, sticky-surfaced film, which does not slide easily over the electrodes or guides, and BOPP film (biaxially oriented polypropylene), which is sold to be optically clear and is easily scratched.

Moreover, some plastics exude small quantities of solid or liquid, which can become deposited on the contacting electrode surfaces or guides and can alter the capacitive readings.

The present invention provides a sensor for measuring the thickness of a film or sheet, said sensor including gas outlet means for providing a layer of pressurised gas between the sensor and the film or sheet when gas is supplied to the outlet means.

The gas layer provides a protective cushion between the film and the electrode arrangement of the sensor, and allows the separation between the film and sensor to be small and constant, whilst ensuring that no contact is made between the sensor and film. This lack of direct contact and the ability to provide a small constant separation distance allows the sensor to be used with sticky films, prevents scratching of the film and prevents the formation of deposits on the electrodes.

Moreover, when the sensor is used on a film in the form of a pressurised bubble, for example in the on-line testing of the production of BOPP film, the sensor may deform the shape of the film to conform to that of the electrodes, with the pressure of the protective gas layer balancing against the pressure inside the film bubble.

The pressure of the gas supplied to the sensor and the total cross sectional area of the gas outlet means determine the average gas layer thickness, so, for example, the pressure of air supplied to a sensor may be n the region of 1 PSI (6.9 kPa) with the gas outlet means providing a restriction to lower the pressure to a value consistent with that of the film bubble. The film bubble pressure is, in the above situation, typically below 10 mm water gauge, and most of the pressure of the gas layer drops over the area of the gas outlet means. If the gas gap widens locally, the pressure of the gas layer is lower at that point, and the film is pushed towards the sensor. Such a system is therefore self-balancing and tends to maintain a uniform gas layer thickness between the film and sensor.

In a preferred form, the sensor comprises a central electrode surrounded by an outer electrode, because such an arrangement provides a compact and sensitive device. The gas outlet means comprises a number of ports disposed around the central electrode and may advantageously be formed in the outer electrode. It would however be possible for the ports to be formed elsewhere, for example in an insulator provided between the electrodes or between the electrodes themselves.

In one arrangement of the sensor, the central and outer electrodes are mounted on a backboard, with the central electrode being in the form of a cylindrical rod extending from the backboard, and the outer electrode forming a housing around the central electrode to define an inner annular chamber. The electrodes are separated by an insulator at the sensing surface of the sensor, and electronics for the sensor may be mounted on the backboard. When the sensor takes this form, the pressurised gas may be supplied to the gas outlet means via the inner annular chamber. This arrangement however has the disadvantage that oil and water pollutants from the gas could short and disrupt the connections between the electronics, since the connections are located on the surface of the backboard facing the inner chamber. Therefore, extra precautions such as filters may need to be provided.

In a preferred form, the outer electrode comprises an inner skin and an outer skin between which is defined a gas passage for supplying the gas outlet means with pressurised gas. This provides the advantage that the gas bypasses the electrical connections and so precautions such as filtering of the gas supply are not so important. Moreover, the outer skin may be adapted to be removable from the inner skin, for example by being connected to the inner skin by a screw thread. This makes the gas passage easily accessible for cleaning purposes.

In a preferred form, the gas outlet means comprises an annular opening between the outer and inner skins of the outer electrode, although it could equally comprise ports. Preferably, the gas passage has a larger cross-sectional area than the gas outlet means, in order to allow the inner gas pressure and the gas pressure of the layer to stabilise.

Preferably the gas outlet means is supplied with a regulated pressure. This may be achieved by fitting a pressure sensor to sense the pressure of gas supplied to the gas outlet means and controlling a source of pressurised gas in dependence on the sensed pressure. Alternatively a pressure regulator, e.g. a spring-loaded valve, may be built into the sensor.

Preferably, the sensing surface of the sensor, which faces the film, is curved, in use, away from the film, at least in the edge region of this surface, to take account of the deformation of the film in the gas flow which will tend to be greater toward the center of the gas layer.

Sensors according to the invention may be used on many types of film, and wherever direct contact with a film is undesirable. The electrodes may be arranged in a variety of manners and may have any of a number of shapes, such as oval or rectangular.

Where the film is in the form of a flat rigid sheet which cannot flex to conform to the sensor electrodes and cannot therefore make good contact, a sensor according to the invention, with preferably electrodes having flat sensing surfaces and flexible mounting gimbals, may advantageously be used, as it would float on the surface of this flat sheet and the electrodes would remain parallel to the surface of the sheet, even if the sensor itself were tilted at an angle. Moreover the absence of friction would prevent turning moments from upsetting the sensor's stability.

The invention also extends to a method of capacitively measuring the thickness of a film or sheet, wherein a pressurised layer of gas is provided between the film or sheet and the measuring electrodes of a capacitive sensor.

Figure 2:
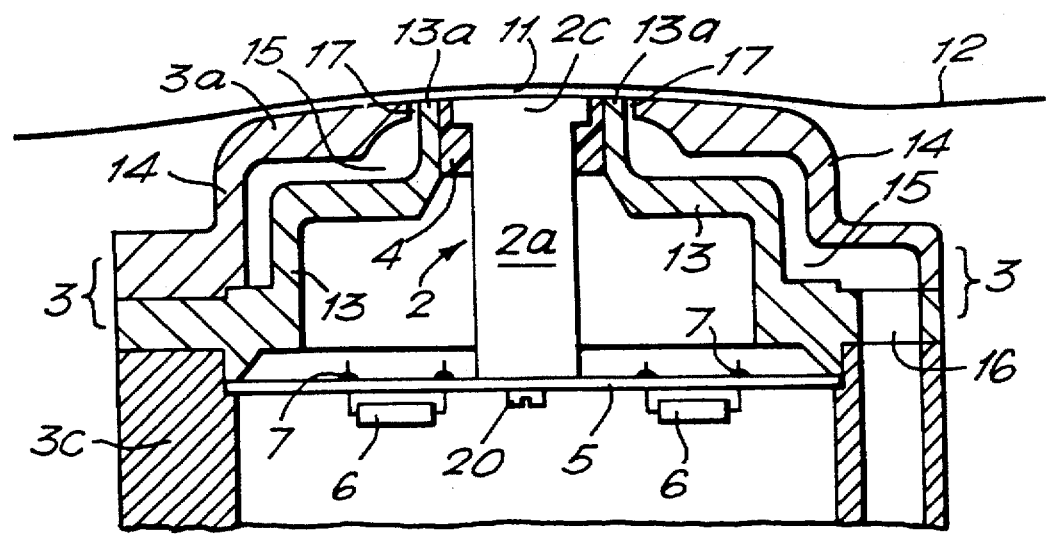

Embodiments of the invention will now be described, by way of example only, with reference to the accompanying drawings, in which:

FIG. 1 shows a cross-sectional view of a sensor according to a first embodiment of the present invention; and FIG. 2 shows a cross-sectional view of a sensor according to a second embodiment of the present invention.

Referring firstly to FIG. 1, the sensor 1 comprises a central electrode 2, an outer electrode 3, an insulator 4, and a backboard 5 on which is mounted electronic circuitry 6 connected via tracks 7.

The central electrode 2 extends from the backboard 5 and is connected at its backboard mounting to the sensor electronics 6. The central electrode 2 has a cylindrical portion 2a and an enlarged sensing surface portion 2c. The cylindrical portion 2a has an internal thread (not shown) whereby it can be secured to the backboard 5 by a screw 20.

The outer electrode 3 forms the housing of the sensor 1, and comprises a sensing surface 3a extending around the sensing surface 2c of the central electrode, and a wall portion 3b connected to a securing ring 3c by for example screw threads or bolts so as to sandwich the backboard 5 therebetween. The outer electrode 3 is connected to ground via an annular contact (not shown) disposed between the end of the wall portion 3b and the backboard 5.

Air outlet means is provided by ports 8 formed in the outer electrode 3 and disposed radially about the central electrode 2. The ports 8 are connected to an inner chamber 9 defined by the central and outer electrodes 2,3. Air is supplied to the sensor 1 via inlet port 10, and flows via chamber 9 through ports 8 to produce a layer of air 11 between the sensor 1 and the film 12 whose thickness is being measured.

The layer of air 11 prevents contact with the film 12 and also helps to maintain a constant spacing between the sensor electrode surfaces 2c,3a and the film 12.

Both the central electrode sensing surface 2c and the outer electrode sensing surface 3a are curved.

Referring now to FIG. 2, the sensor shown is similar in many respects to the sensor of FIG. 1. Therefore, the same reference numerals are used for similar elements.

In this embodiment, the outer electrode 3 comprises an inner skin 13 and an outer skin 14, between which is defined an annular air passage 15 to which air is supplied via inlet 16, and which terminates at air outlet means comprising an annular opening 17 surrounding the sensing surface 13a of the inner skin 13. The sensor 1 works in the same manner as in the last embodiment, but the pressurised air is prevented from contacting the tracks 7 mounted in chamber 9.

In order to allow the inner pressure to equalise and to produce a uniform air curtain, the cross-sectional area of the air passage 15 is much larger than that of the annular opening 17. Thus the air outlet means provides a restriction in the air flow.

Also in this embodiment, the curvature of the sensing surface 2c of the central electrode 2 is of much greater radius than in the first embodiment. In either embodiment, the sensing surface 2c could even be flat in certain circumstances.

In both embodiments, the air pressure fed to the sensor is regulated between about 1 and 3 PSI (6.9 to 20.7 kPa), to maintain a small constant air gap between the sensor 1 and film 12. The pressure is set at a value just in excess of the level at which direct physical contact with the film is lost, and although this results in the loss of measurement sensitivity in the order of between about 10 to 20%, this can be restored by adjusting the calibration sensitivity of the electronic circuitry used with the sensor.

With regard to the electronic circuitry 6, many circuits for measuring capacitance are known. As an example, the sensing electrodes may form the frequency determining capacitor of an oscillator circuit, with a reference oscillating circuit having a similar inductance as the first oscillating circuit and having its frequency fixed by a variable capacity diode during an auto-zeroing cycle. In this example, during the auto-zero cycle, a computer monitors the beat frequency between the two oscillators while there is no film by the electrodes and then controls the voltage on the variable capacity diode to attain a low initial beat frequency. During the measurement cycle the feedback voltage to the variable capacity diode is held constant and the beat frequency rises with the thickness of the film being measured. Of course, other techniques, such as the use of an a.c. bridge, could be used.

I claim:

1. A capacitance sensor for non-contact measurement of the thickness of sheet material, said sensor comprising:

a central electrode having a sensing surface which is symmetric with respect to an axis and an outer electrode having a sensing surface surrounding said sensing surface of said central electrode, said sensing surface of said outer electrode also being symmetric with respect to said axis and said sensing surfaces being spacially separated and coaxial, said sensing surfaces cooperating to define a non-planar reference surface, a capacitance between said sensing surfaces of said central and outer electrodes being influenced by sheet material suspended adjacent said reference surface so as to bridge at least part of the space separating said coaxial sensing surfaces;

gas outlet means, said gas outlet means providing a layer of pressurized gas between said sensing surfaces of said electrodes and the sheet material to keep said sensing surfaces from contacting the sheet material during thickness measurement, gas passed through said outlet means flowing between said sensing surfaces and the sheet material and causing the sheet material to generally conform to the shape of said reference surface; and electronic means for determining the thickness of the sheet material from the capacitance measured between said sensing surfaces while the sheet material is held away from said sensing surfaces by the layer of pressurized gas.

2. A sensor according to claim 1 wherein the gas outlet means provides a restriction in the gas flow.

3. A sensor according to claim 1, comprising means for regulating the pressure of the gas supplied to said gas outlet means.

4. A sensor according to claim 1, wherein said central electrode is circular.

5. A sensor according to claim 1 wherein the gas outlet means comprises a number of ports disposed around said central electrode.

6. A sensor according to claim 1 wherein the gas outlet means is formed in said outer electrode.

7. A sensor according to claim 1 wherein said electrodes are separated by an insulator at the sensing surface of the sensor.

8. A capacitive sensor for non-contact measurement of the thickness of sheet material, said sensor comprising:

a central electrode having a sensing surface and an outer electrode having a sensing surface surrounding said sensing surface of said central electrode, a capacitance between said sensing surfaces of said central and outer electrodes being influenced by sheet material disposed adjacent both of said sensing surfaces; and gas outlet means, said gas outlet means providing a layer of pressurized gas between said sensing surfaces of said electrodes and the sheet material to keep said sensing surfaces from contacting the sheet material during thickness measurement, when gas is passed through said outlet means and between said sensing surfaces and the sheet material;

wherein said central electrode and said outer electrode are mounted on a backboard having a center and a periphery, with said central electrode being in the form of a cylindrical rod mounted at the center of said backboard, and with said outer electrode mounted about the periphery of said backboard and being in the form of a housing around and electrically isolated from said central electrode.

9. A capacitive sensor for non-contact measurement of the thickness of sheet material, said sensor comprising:

a central electrode having a sensing surface and an outer electrode having a sensing surface surrounding said sensing surface of said central electrode, a capacitance between said sensing surfaces of said central and outer electrodes being influenced by sheet material disposed adjacent both of said sensing surfaces; and gas outlet means, said gas outlet means providing a layer of pressurized gas between said sensing surfaces of said electrodes and the sheet material to keep said sensing surfaces from contacting the sheet material during thickness measurement, when gas is passed through said outlet means and between said sensing surfaces and the sheet material;

wherein said central electrode and said outer electrode are mounted on a backboard having a center and a periphery, with said central electrode being in the form of a cylindrical rod mounted at the center of said backboard, and with said outer electrode mounted about the periphery of said backboard and being in the form of a housing around and electrically isolated from said central electrode, said inner and outer electrodes defining an inner annular chamber therebetween; and wherein means are provided for supplying pressurized gas to said gas outlet means via said inner annular chamber.

10. A capacitive sensor for non-contact measurement of the thickness of sheet material, said sensor comprising:

a central electrode having a sensing surface and an outer electrode having a sensing surface surrounding said sensing surface of said central electrode, a capacitance between said sensing surfaces of said central and outer electrodes being influenced by sheet material disposed adjacent both of said sensing surfaces; and gas outlet means, said gas outlet means providing a layer of pressurized gas between said sensing surfaces of said electrodes and the sheet material to keep said sensing surfaces from contacting the sheet material during thickness measurement, when gas is passed through said outlet means and between said sensing surfaces and the sheet material;

wherein said outer electrode comprises an inner member and an outer member, said inner member and said outer member cooperating to define a gas passage therebetween, pressurized gas being supplied to said gas outlet means through said passage.

11. A sensor according to claim 10, wherein said outer member and said inner member define an annular opening therebetween at the downstream end of said gas passage, said annular opening being said gas outlet means.

12. The sensor of claim 10, wherein said outer electrode is in the form of a housing about and electrically isolated from said central electrode.

13. A sensor according to claim 10 wherein said gas passage has a larger cross-sectional area than said gas outlet means.

14. A capacitive sensor for non-contact measurement of the thickness of sheet material, said sensor comprising:

a central electrode having a sensing surface and an outer electrode having a sensing surface surrounding said sensing surface of said central electrode, a capacitance between said sensing surfaces of said central and outer electrodes being influenced by sheet material disposed adjacent both of said sensing surfaces; and gas outlet means, said gas outlet means providing a layer of pressurized gas between said sensing surfaces of said electrodes and the sheet material to keep said sensing surfaces from contacting the sheet material during thickness measurement, when gas is passed through said outlet means and between said sensing surfaces and the sheet material;

wherein said outer electrode comprises an inner member and an outer member, said inner member and said outer member cooperating to define a gas passage therebetween, pressurized gas being supplied to said gas outlet means through said passage; and wherein said outer electrode outer member is separably removable from adjacent said inner member.

15. A capacitive sensor for non-contact measurement of the thickness of sheet material, said sensor comprising:

a sensing surface, said sensing surface including a central electrode and an outer electrode surrounding said central electrode, a capacitance between said central and outer electrodes being influenced by sheet material disposed adjacent said surface and overlapping said central electrode and at least a portion of said outer electrode; and gas outlet means, said gas outlet means providing a layer of pressurized gas between said electrodes and the sheet material when gas is supplied to said gas outlet means;

said outer electrode being curved in at least an outer edge region in a direction away from the sheet material to compensate for greater gas flow in the region of the center of said sensing surface and to ensure maintenance of a set distance between said sensing surface and the sheet material.

16. A capacitive sensor for non-contact measurement of the thickness of sheet material, said sensor comprising:

electrode means comprising an arrangement of sensing surfaces of measuring electrodes on a flat surface which in use faces sheet material to be measured, a capacitance of the electrode arrangement being influenced by sheet material disposed adjacent said electrode arrangement; and gas outlet means, said gas outlet means providing a layer of pressurized gas between said flat surface and the sheet material when gas is supplied to said gas outlet means;

said electrode means being mounted on flexible mounting gimbals to ensure that said flat surface remains parallel to and at a set distance from the sheet material.

17. A method of capacitively measuring the thickness of sheet material without contacting the sheet material, said method comprising the steps of:

causing the sheet material to at least in part be formed into a portion of a bubble;

placing a capacitive sensor adjacent an outer surface of the bubble with a front face of said sensor opposing the bubble, said front face including at least an inner electrode sensing surface and an outer electrode sensing surface surrounding said inner electrode sensing surface, with at least edge regions of said front face curving back from a central region of said front face away from the bubble;

constantly providing a layer of pressurized gas between the bubble and said front face to keep the bubble and said front face a set distance apart; and determining the thickness of the sheet material by detecting a change in capacitance of said electrode sensing surfaces when said front face is placed adjacent the bubble.

18. A method as claimed in claim 17 wherein the gas is provided through gas outlet means provided in or between the electrodes of the sensor.

19. A method as claimed in claim 17 wherein said gas outlet means provides a restriction in the gas flow.

20. A method as claimed in claim 17 wherein gas is supplied to said gas outlet means at a regulated pressure.

21. A method of capacitively measuring the thickness of sheet material without contacting the sheet material, said method comprising the steps of:

placing a capacitive sensor adjacent a surface of the sheet material with a front face of said sensor opposing the sheet material, said front face including at least an inner electrode sensing surface and an outer electrode sensing surface surrounding said inner electrode sensing surface, with at least edge regions of said front face curving back from a central region of said front face away from the sheet material;

constantly passing pressurized gas through gas outlets of said front face and between the sheet material and said front face to provide a layer of pressurized gas between the sheet material and said front face to keep the sheet material and said sensing surfaces a set distance apart; and determining the thickness of the sheet material by detecting a change in capacitance between said electrode sensing surfaces when said front face is placed adjacent the sheet material.

* * * * *